United States Patent
Witkowski

(10) Patent No.: US 6,449,606 B1
(45) Date of Patent: *Sep. 10, 2002

(54) USING A MATERIALIZED VIEW TO PROCESS A RELATED QUERY CONTAINING AN ANTIJOIN

(75) Inventor: Andrew Witkowski, Foster City, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,913

(22) Filed: Dec. 28, 1998

(51) Int. Cl.$^7$ .............................................. G06F 17/00
(52) U.S. Cl. ................................ 707/3; 707/4; 707/100
(58) Field of Search ...................... 707/1–206; 711/1–6, 711/200–203; 709/1, 100; 717/1–11, 100

(56) References Cited

U.S. PATENT DOCUMENTS

| | | | |
|---|---|---|---|
| 5,584,024 A | 12/1996 | Schwartz | 707/4 |
| 5,701,455 A | * 12/1997 | Bhargava et al. | 707/2 |
| 5,812,840 A | 9/1998 | Schwartz | 707/4 |
| 5,897,632 A | 4/1999 | Dar et al. | 707/2 |
| 5,950,210 A | 9/1999 | Nelson | 707/203 |
| 5,956,706 A | 9/1999 | Carey et al. | 707/2 |
| 5,960,427 A | * 9/1999 | Goel et al. | 707/4 |
| 5,963,933 A | * 10/1999 | Cheng et al. | 707/2 |
| 5,970,482 A | 10/1999 | Pham et al. | 706/16 |
| 5,974,407 A | 10/1999 | Sacks | 707/2 |
| 5,987,455 A | 11/1999 | Cochrane et al. | 707/4 |
| 5,991,754 A | 11/1999 | Raitto et al. | 707/2 |
| 6,125,360 A | 9/2000 | Witkowski et al. | 707/2 |
| 6,134,543 A | 10/2000 | Witkowski et al. | 707/2 |
| 6,199,063 B1 | 3/2001 | Colby et al. | 707/4 |

OTHER PUBLICATIONS

Rao et al., "Using EELs, a practical approach to outerjoin and antijoin reordering"; Apr. 2–6, 2001; Data Engineering, 2001, Proceedings, 17th International Conference on, 585–594.*

Weilbrauch, "DB2 for OS/390 V5 vs. V6 outer join performance3"; Apr. 24–25, Apr. 2000; Performance Analysis of Systems and Software, 2000, IEEE International Symposium on, pp. 46–51.*

Scheurmann et al., "Query processing in multidatabase systems"; Oct. 18–21, 1992; Systems, Man and Cybernetifcs, 1992 IEEE International Conference on, vol. 2, pp. 1250–1254.*

Chaudhuri, Surajit et al., "Optimizing Queries with Materialzed Views", Proceedings of the Eleventh International Conference on Data Engineering, Mar. 6–10, 1995, pp. 190–200.

Gopalkrishnan, Vivekanand et al., "Issues of Object–Relational View in Data Warehousing Environment", 1998 IEEE International Conference on Systems, Man, and Cybernetics, Oct. 11–14, 1998, vol. 3, pp. 2732–2737.

Kuno, Harumi et al., "Augmented Inherited Multi–Index Structure for Maintenance of Materialized Path Query Views", Proceedings of the Sixth International Conference on Research Issues in Data Engineering, Feb. 26–27, 1996, pp. 128–137.

Segev, Arie et al., "Maintaining Materialized Views in Distributed Databases", Proceedings of the Fifth International Conference on Data Engineering, Feb. 6–10, 1989, pp. 262–270.

(List continued on next page.)

*Primary Examiner*—David Jung
(74) *Attorney, Agent, or Firm*—Hickman Palermo Truong & Becker LLP; Marcel K. Bingham

(57) ABSTRACT

A method and apparatus for transforming queries is provided. A select-project-join query Q that specifies an antijoin is rewritten into another query that references the materialized view M. The common section includes the tables being antijoined, and may be one-to-many lossless with respect to the join with the materialized view delta.

28 Claims, 13 Drawing Sheets

OTHER PUBLICATIONS

Bhargava, Gautam et al., "Hypergraph based reorderings of outer join queries with complex predicates", Proceedings of the 1995 ACM SIGMOND International Conference on Management of Data and Symposium on Principles of Database Systems, May 22–25, 1995, AC.

Bhagrava, Gautam et al., "Efficient processing of outer joins and aggregate junctions", Proceedings of the Twelfth International Conference Data Engineering, 1996., Feb. 26–Mar. 1, 1996, pp. 441–449.

Biggs, Maggie, "Oracle8 still in pole position", InfoWorld, Framingham; Dec. 15, 1997, vol. 19, Issue 50, p. 1, 97, ISSN: 01996649.

Chen, Arbee, "Outerjoin Optimization in Multidatabase Systems", Proceedings of the Second International Symposium on Databases in Parallel and Distributed Systems, 1990, Jul. 2–4, 1990, pp. 211–218.

Pang, HweeHwa et al., "Partially Preemptble Hash Joins", Proceedings of the 1993 ACM SIGMOND international conference on Mangement of data, 1993, pp. 59–68.

Ross, Kenneth et al., "Materialized view maintenance and integrity constraint checking: trading space for time", Proceedings of the 1996 ACM SIGMOND international conference on Management of data, Jun. 3–6, 1996, pp. 447–458.

O'Neil et al., "Multi–Table Joins Through Bitmapped Join Indices", SIGMOND Record, vol. 24, No. 3, Sep. 1995, pp. 8–11.

Yan, Weipeng et al., "Performing Group–By before Join", Proceedings of the $10^{th}$ International Conference on Data Engineering, 1994, Feb. 14–18, 1994, pp. 89–100.

Lee, Byung Suk et al., "Outer joins and filters for instantiating objects from relational databases through views", IEEE Transactions on Knowledge and Data Engineering, Feb. 1994, vol. 6, Issue 1, pp. 108–119.

Log, Ming–Ling et al., "Spatial Hash–Joins", Proceedings of the 1996 ACM SIGMOND International Conference on Management of Data, 1996, pp. 247–258.

Marek, Robert et al., "TID Hash Joins", Proceedings of the third international conference in Information and knowledge management, 1994, No. 2–, Dec. 2, 1994, pp. 42–49.

Mishra, Priti et al., "Join Processing in Relational Databases", ACM Computing Surveys, vol. 24, No. 1, Mar. 1992, pp. 63–113.

Liu et al., "Derivation of incremental equations for nested relations", Database Conference, 2001, ADC 2001, Proceedings, $12^{th}$ Australasian, 2001, pp. 76–82.

Moro et al., "Incremental maintencance of multi–source views", Database Conference, 2001, ADC 2001, Proceedings, $12^{th}$ Australasian, 2001, pp. 13–20.

Ling et al., "A model for evaluating materialized view maintenance algorithms", Web Information Systems Engineering, 2000, Proceedings of the First International Conference on, vol. 1, 2000, pp. 374–382.

Bello et al., "Materialzied Views in Oracle", VLDB '98, Proceedings of $24^{th}$ International Conference on Very Large Data Bases, Aug. 24–27, 1998, New York City, New York, USA.

http://www.research.att.com/conf/vldb98/program.html, Mar. 2001.

http://www.research.att.com/conf/vidb98, Mar. 2001.

* cited by examiner

FIG. 1

Table L — 320

| l.rowid | l.a | l.b |
|---------|-----|-----|
| L₁ | 1 | a |
| L₂ | 2 | b |
| L₃ | 3 | a |
| L₄ | " | b |

Table O — 330

| o.rowid | o.a | o.b |
|---------|-----|-----|
| O₁ | 1 | 1 |
| O₂ | 2 | 3 |

Antijoin Table — 340

| l.rowid | l.a |
|---------|-----|
| L₂ | 2 |
| L₃ | 3 |

Table C — 350

| c.a | c.b |
|-----|-----|
| 1 | a |
| 2 | b |

L→O→C materialized view LOC — 370

| l.rowid | l.a | o.rowid | o.a | o.b | c.a | c.b | |
|---------|-----|---------|-----|-----|-----|-----|---|
| L₁ | 1 | O₁ | 1 | 1 | 1 | a | |
| L₂ | 2 | O₂ | 2 | 3 | " | " | ← row 374 |
| L₃ | 3 | " | " | " | " | " | ← row 376 |
| L₄ | " | " | " | " | " | " | ← row 378 |

FIG. 3B

1040 → SELECT l.a, j.a FROM (SELECT DISTINCT l.a, j.a, l.rowid, FROM LOC WHERE (
      └─────1044─────┘└──────────────Operands 1046──────────────┘

(o.rowid IS NULL and l.a IS NOT NULL) OR
(o.rowid IS NOT NULL and NOT (o.b = 1)))

FIG. 10

USING A MATERIALIZED VIEW TO PROCESS A RELATED QUERY CONTAINING AN ANTIJOIN

FIELD OF THE INVENTION

The present invention relates to optimizing queries, and in particular, to rewriting join queries to access data through a view or from a materialized view.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it is not desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

The data presented by conventional views is gathered and derived on-the-fly from the base tables in response to queries that access the views. The data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate form the base tables from which the data was originally gathered and derived. The data contained in a materialized view is referred to herein as "materialized data". Materialized views eliminate the overhead associated with gathering and deriving the view data every time a query accesses the view.

However, to provide the proper data, materialized views must be maintained to reflect the current state of the base tables. When the base tables of a materialized view are modified, computer resources must be expended to both determine whether the modifications require corresponding changes to the materialized data, and to make the required corresponding changes. Despite the high cost associated with maintaining materialized views, using a materialized view can lead to significant overall cost savings relative to a conventional view when the materialized view represents a set of data that is infrequently changed but frequently accessed.

A view is defined by metadata referred to as a view definition. The view definition contains mappings to one or more columns in the one or more tables containing the data. Columns and tables that are mapped to a view are referred to herein as base columns and base tables of the view, respectively.

Typically, the view definition is in the form of a database query. These queries, like any database query, must conform to the rules of a particular query language such as the ANSI Structured Query Language (SQL). For example, the query:

SELECT T.a FROM T WHERE T.b=1 retrieves column T.a of table T for those rows whose value in T.b equals 1. The above query includes a SELECT clause (i.e. "SELECT T.a"), a FROM clause (i.e. "FROM T"), and a WHERE clause (i.e. "T.b=1"). The FROM clause specifies one or more tables or views from which to retrieve values. The tables or views are referred to as the FROM list. The SELECT clause specifies one or more columns in the items in the FROM list from which to retrieve values. The one or more columns are referred to as the SELECT list. The WHERE clause specifies the rows from which the values are retrieved. Specifically, the WHERE clause contains one or more logical expressions defining criteria that must be meet by the rows from which values are retrieved.

Views are often based on joins of two or more tables. A join is an operation that combines rows from two or more tables and views that meet a condition.

Figure 1:
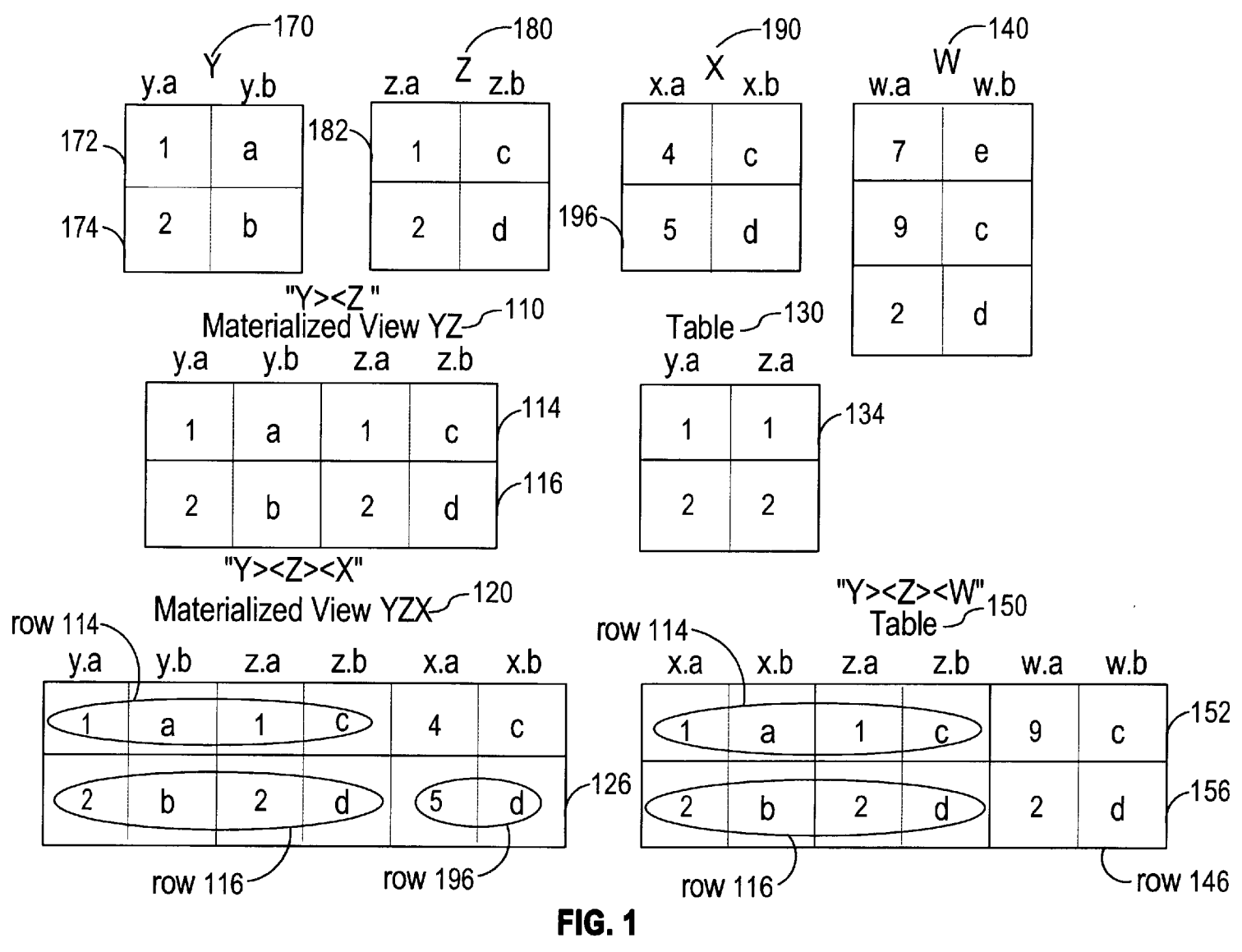

FIG. 1 shows tables that are used to illustrate a join. FIG. 1 shows tables X 190, Y 170, and Z 180. Materialized view YZ 110 represents the results of an "equijoin" between tables Y 170 and Z 180. An equijoin is a particular type of join where a row from a first table is combined with one or more rows from a second table, if the value in a specified column from the first table equals a value in a specified column from the second table. For example, combining the rows from table Y 170 and table Z 180 using the join condition y.a=z.a produces materialized view YZ 110. In materialized view YZ 110, row 114 was formed by combining row 172 (i.e. columns y.a and y.b in row 114) and 182 (i.e. columns z.a and z.b in row 114) because for rows 172 and 182, the value in y.a equals the valve in z.a. Because the logical expression y.a=z.a is based on columns from the joined tables, it is referred to as a join condition.

A join is performed whenever a join is specified by a query. As a matter of convenience, the value in a column of a row may be referred to by the label or name of the column. For example, the expression "value in y.a equals the value in z.a" may be expressed as "y.a equals z.a", or "y.a=z.a".

A join may be specified by a query by including the tables to be joined in the FROM list and including a logical expression specifying the needed conditions in the WHERE clause. For example, the previous equijoin of tables Y 170 and Z 180 may be specified by a query as follows:

SELECT*FROM Y, Z WHERE y.a=z.a

In addition to join conditions, the WHERE clause of a join query can also contain other conditions that refer to columns of only one table. These conditions can further restrict the rows returned by the join query.

Generating joins in response to receiving join queries can require a substantial amount of processing. To reduce the amount of such processing, a database manager transforms join queries to retrieve data from the "preprocessed" materialized data residing in a materialized view. Currently, database systems that include query rewrite mechanisms rewrite some types of join queries but not other types of join queries.

An example of a query not transformed under the conventional approach is a query based on an antijoin of tables. Let W|-p(w,t)T denote a antijoin between tables W and T on condition p(w,t). A antijoin results in another table that consists of the rows in W where condition p(w,t) evaluates to FALSE. If the condition is not relevant, a shorter notation W|-T is used to represent the antijoin. The first table W is referred to as the "left" table, and the second table T as the "right" table with respect to the antijoin. Typically, the condition of an antijoin requires that a column from the left table match the value of a column in the right table. Structures shown in FIG. 2 are used as an example to illustrate an antijoin.

FIG. 2 shows table W 270 and T 280 and antijoin table 250. Antijoin table 250 represents the results of an antijoin between table W 270 and table T 280 through the join condition w.a=t.a. Row 272 and row 274 are not reflected in antijoin table 250 because each meet the join condition with respect to a row in the table T 280. No row in table T 280 meets the join condition with respect to row 276, thus row 276 is reflected in antijoin table 250. Finally, row 278 is not reflected in the antijoin table 250 because when for a particular row, the left table column in the join condition (i.e. w.a) contains the NULL value, the row is not included in the results of the antijoin.

Because using the "preprocessed" materialized data of a materialized view frequently saves the computer resources required to process queries, it is desirable to provide a method of satisfying an antijoin query from the materialized data of a materialized view that contains data that may be used to satisfy an antijoin query.

SUMMARY OF THE INVENTION

A method and apparatus for transforming queries is described. According to an aspect of the present invention, a select-project-join query Q that specifies an antijoin is rewritten into another query that references the materialized view M. The part of Q that is rewritten using M includes the tables being antijoined. Query Q can contain multiple joins and antijoins, as well as aggregates, distinct, and group by clauses. The invention transforms one-to-one and one-to-many lossless joins.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is block diagram depicting tables and materialized views;

FIG. 3B is a block diagram depicting tables and a materialized view used to illustrate query transformation according to an embodiment of the present invention;

FIG. 10 is a diagram depicting a transformation query resulting from the transformation of the given query according to an embodiment of the present invention.

DESCRIPTION OF THE PREFERRED EMBODIMENT

Figure 2:
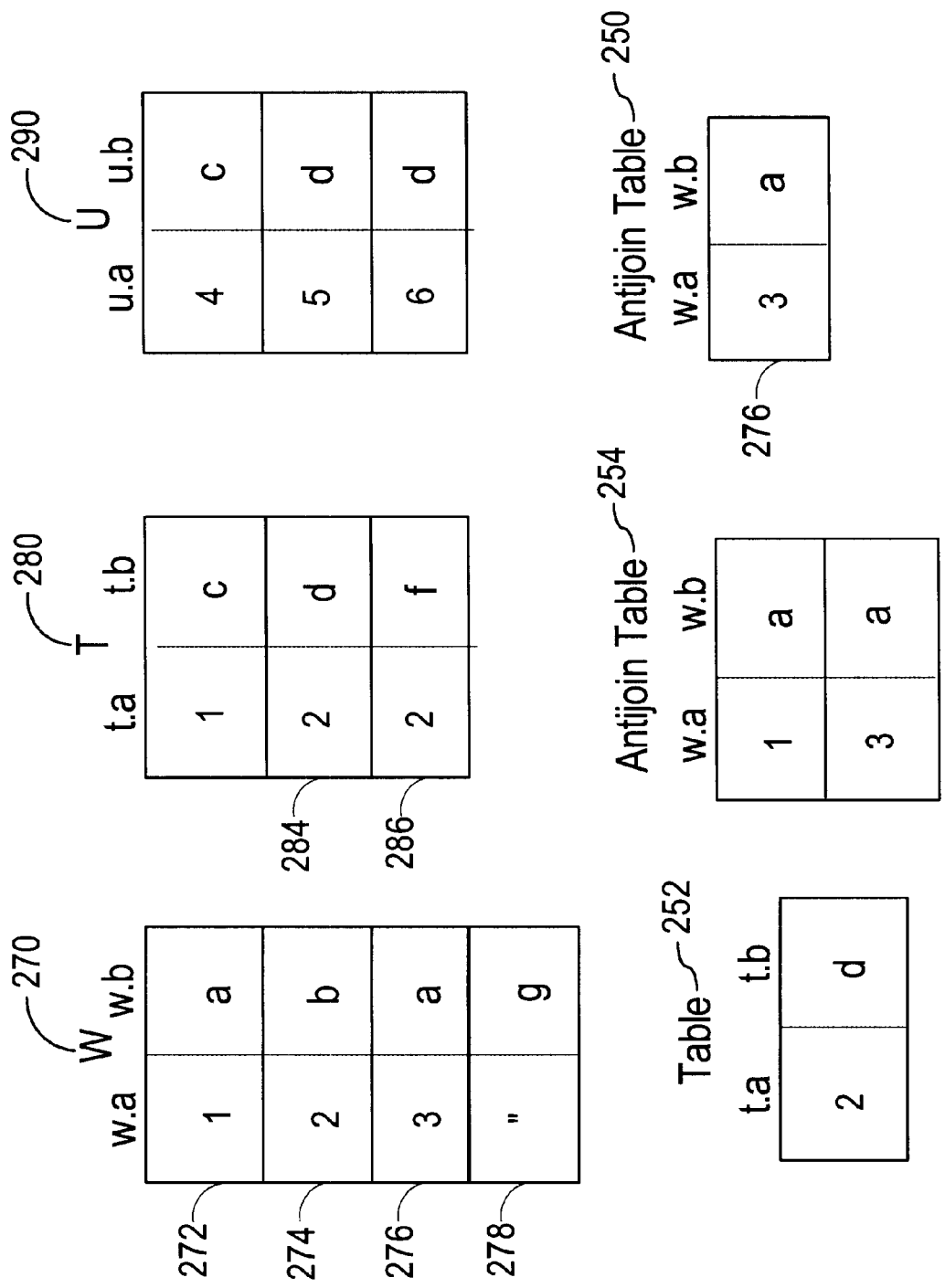
FIG. 2 is block diagram depicting tables and materialized views used to illustrate a antijoin.

A method and apparatus for transforming queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Terms and Notation

For the purpose of explanation, the following terms and conventions are used herein to describe embodiments of the invention:

Let $R><_{p(r,s)}S$ denote an inner join between tables R and S on condition p(r,s). The result is another table which consists of all rows from R and S that satisfy the condition p(r,s). For example, $R><_{r.c=s.c}S$ is an inner join of R and S on condition r.c=s.c. If the condition is not relevant to the context of discussion, a shorter notation R><S may be used.

Let $R->_{p(r,s)}S$ denote an outer join between tables R (the outer or left table) and S (the inner or right table) on condition p(r,s). An outer join contains all rows from R and S that satisfy the condition p(r,s) and all remaining rows from R, the outer table, that do not. The latter rows are called the anti-join rows. All columns from S (i.e. inner table) are set to null for the antijoin rows. A select-project-join query is a query that contains joins, selections on individual tables, and projections on a subset of columns of individual tables. A "selection" is a subset of rows of a table that satisfy some condition. For example, r.c=1 is a selection on rows of R where column c is 1. A "projection" is a subset of columns of a table. The ANSI SQL query language defines the projection with the SELECT clause, which lists the projected columns of tables and defines the selection and join with the WHERE clause. For example, SELECT r.c, s.c FROM R, S WHERE r.c=s.c AND r.x=1 AND s.y=1, projects the join $R \bowtie_{r.c=s.c} S$ on columns r.c and s.c and restricts the tables R and S to rows where r.x=1 and s.y=1 respectively.

A unique key (UK) is a column or set of columns that uniquely identify rows in a table. At least one column of a UK must be not null. One of the UKs of a table may be designated as a primary key (PK).

A join R><S is lossless with respect to R if it preserves all rows of R. By convention we will place the preserved table R, as the first table in the join and will sometimes skip the phrase with respect to R'. A left outer join R->S naturally preserves all rows of R, and is thus lossless.

A join R><S is a one-to-one join if a row from R joins with at most one row from S. A join R><S is one-to-one lossless with respect to R if the join is lossless with respect to R and one-to-one with respect to R.

A join R><S is one-to-many if a row from R joins with more than one row from S.

Referential Integrity is a relationship between columns of two tables where the values of the columns of one table, called the child columns, are limited to the set of values in the columns of the other table, called the parent columns. The R.c column is referred to as being referentially constrained by the S.c column. Observe that the join $R \bowtie_{r.c=s.c} S$ where the column R.c is referentially constrained by the S.c column is lossless.

The term "left join column" refers to the left table column that is in the join condition of an antijoin. Similarly, the term "right join column" refers to the right table column that is in the join condition of the antijoin. For example, in $S|_{s.a=t.a}$ T, s.a is the left join column, and t.a is the right join column.

A rowid pseudo-column contains a unique identifier for each row in a table. A pseudo-column may, for example, simply represent the values of the actual storage locations at which the rows are stored.

In ANSI SQL tables may contain duplicate rows. A DISTINCT operator is provided to eliminate duplicates of rows that have the same values in a specified set of columns. For example:

SELECT DISTINCT T.a, T.b FROM T returns only distinct two-column rows from T even if T originally contained duplicates.

The term "outer query block" refers to a query block that contains one or more query blocks. For example, the outer query in the following query illustrates an outer query block:

SELECT V.a FROM W, (SELECT*FROM U, W) WHERE W.b=V.b

The SELECT clause of the above outer query block is SELECT V.a, and the FROM list of the outer query is FROM W, (SELECT*FROM U, W). The query block contained by the outer query block is (SELECT*FROM U, W).

There exists an alternative definition of an antijoin where the antijoin between table W and T on condition p(w,t) is another table consisting of the rows in W where condition p(w,t) doesn't evaluate to TRUE, i.e., it evaluates to FALSE or UNKNOWN. In the previous definition the condition had to evaluate to FALSE. Condition p(w,t) can evaluate to UNKNOWN when one of the compared values is NULL. According to the first definition, the row would not be included in the result and according to the second it would.

The illustrations provided herein are based on the antijoin as it agrees with the semantic of the NOT IN predicate in ANSI SQL standard. However, with trivial changes the rewriting techniques illustrated herein apply to the antijoins of the latter definition.

Specifying an Antijoin in a Query Language

A query may specify an antijoin operation using a variety of syntactical constructs. However, for purposes of illustration, the transformation techniques of the present invention shall be explained with reference to a query using a NOT IN operator. The antijoin between table W 270 (FIG. 2) and table T 280 (the results of which are displayed in antijoin table 250), which is based on the join condition w.a=t.a., may be specified by the following query AJ:

SELECT w.a, w.b FROM W WHERE w.a NOT IN (SELECT t.a FROM T)

The NOT IN operator operates upon a left operand and right operand that specifies a set of values. If the value specified by the left operand is not included in the set of values specified by the right operand, then the expression evaluates to true. In the logical expression "w.a NOT IN (SELECT t.a FROM T)", the set of values specified by the right operand query block, i.e. "(SELECT t.a FROM T)", are the values returned by the query block, i.e. the values in column t.a. Thus, for a given row in table W 270, the logical expression evaluates to TRUE if w.a is not equal to t.a in any row in table T 280. If w.a is NULL, then the logical expression evaluates to UNKNOWN and the row from W is not included in the result. If any value in column t.a is NULL, then the NOT IN expression always evaluates to UNKNOWN and none of the rows in W appear in the result, i.e., the result is empty.

As demonstrated above, a query specifying an antijoin of two tables may be based on a NOT IN operator, where the left operand is the left join column (i.e. w.a), and the right operand is a query block of the right table having a SELECT list consisting of the right join column (t.a). The query block that is the right operand is referred to as the "right table query block".

The right table query block may contain a WHERE clause which further restricts the set of values returned by the right table. This may increase the rows resulting from an antijoin. The following query AJ' serves as an example of query containing a WHERE clause in the right table query block:

SELECT w.b FROM W WHERE w.a NOT IN (SELECT t.a FROM T WHERE t.b='d')

The logical expression in the WHERE clause (i.e. t.b='d') further restricts the set of rows from the right table with which a row in the left table may not combine in order to belong to the resultant rows of an antijoin.

For example, the condition "t.b='d'" in query AJ' restricts the set of rows with which a row in table W 270 may not combine in order to be included the resulting set of the specified antijoin. Table 252 shows the restricted set of rows. The antijoin specified by query AJ' is expressed as $W|_{w.a=t.a} T_{t.b='d'}$. Antijoin table 254 shows the results of the query AJ'. Antijoin table 254 contains one more row than antijoin table 250 generated by query AJ, which specifies S|-T without a applying the WHERE condition of the right query block.

In addition to the NOT IN construct, a query specifying an antijoin may be rewritten based on a query block that uses the NOT EXIST construct. For example, to specify S|-T, the following query may used:

It is also frequent that queries with the quantifier ALL

SELECT w.a, w.b FROM W WHERE w.a=ALL (SELECT t.a FROM T WHERE t.a=w.a)

are converted to antijoins. An example of such a query follows.

SELECT w.a, w.b FROM W WHERE NOT EXISTS (SELECT t.a FROM T WHERE t.a=w.a)

Query Graphs

Figure 3A:
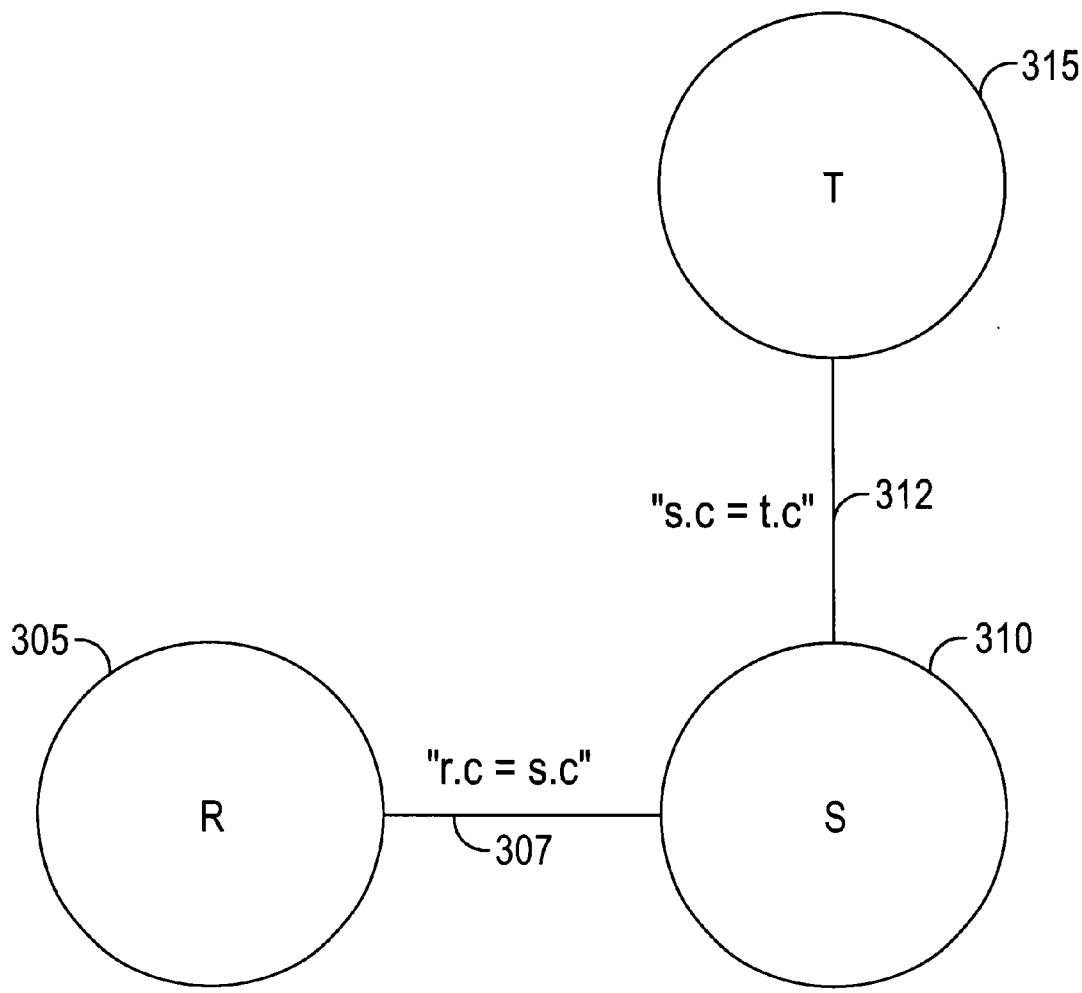
FIG. 3A is a query subgraph according to an embodiment of the present invention.

FIG. 3A shows a query graph, which is a graphical representation of joins in a query. Nodes in the graph represent tables and edges represent joins. For example, the query graph in FIG. 3A represents a query specifying the join R->$_{r.c=s.c}$S><$_{s.c=t.c}$T, or R>S><T for short. The query joins tables R, S and T on the condition (r.c=s.c and s.c=t.c). Node 305 represents table R, node 310 table S, and node 315, table T. Edge 307 represents R->$_{r.c=s.c}$S, and edge 312 represents S><$_{s.c=t.c}$T.

Rewrites Based on Query Graphs

According to an embodiment of the present invention, during a rewrite of query block Q with materialized view M, the join graph G(M) of a materialized view M is compared with the join graph G(Q) of a query block to identify three join subgraphs. The "intersection subgraph" G(I) represents the nodes and edges overlapped by G(M) and G(Q), so G(I)=G(M)∩G(Q). The nodes and edges of G(M) that belong to G(I) are referred to as $G_M(I)$, and the nodes and edges of G(Q) that belong to G(Q) are referred to as $G_Q(I)$. The "delta subgraph" ΔG(Q) represents the part of G(Q) that is not in G(I), so ΔG(Q)=G(Q)–G(I). The "materialized view delta subgraph" ΔG(M) represents the part of G(M) that is not in G(I), so ΔG(M)=G(M)–G(I). For example, if query Q antijoins tables R|-$_{r.a=s.a}$S and materialized view M joins R->$_{r.a=s.a}$S><$_{s.b=t.b}$T><$_{t.a=u.a}$U, then the intersection subgraph may be expressed as GM(I)=R->S, or $G_Q$(I)=R|-S. When the distinction between $G_M$(I) and $G_Q$(I) is unimportant, then G(I) is used. The materialized view delta subgraph ΔG(M) is T><U.

The set of joins that correspond to the intersection subgraph G(I) are referred to as the "common section" (i.e. R->S), the set of joins that correspond to the delta subgraph ΔG(Q) are referred to as the "query delta" (i.e. O><P), and the set of joins that correspond to the materialized view delta subgraph ΔG(M) are referred to as the "materialized view delta" (T><U).

Rewrite of queries that specify antijoins may decompose a query graph G(Q) into a join between the delta query block graph ΔG(Q) and the intersection graph $G_Q$(I), i.e., G(Q)=ΔG(Q)><$G_Q$(I). The query may be rewritten to replace the intersection subgraph $G_Q$(I) with a materialized view, e.g., G(Q)=ΔG(Q)><G(M). Thus the algorithms recover G(Q) by joining ΔG(Q) to the materialized view. This transformation is possible only when certain tests referred to as rewrite tests are satisfied. Select-project-join queries have two tests.

A. The Join Compatibility Test requires that:
1. The intersection subgraph $G_Q$(I) must be contain the tables being antijoined by G(Q).
2. The join of $G_M$(I) to ΔG(M), (e.g. $G_M$(I)><ΔG(M)) is lossless with respect to $G_M$(I).
3. The joins in $G_Q$(I) are derivable from joins in $G_M$(I). If the join in $G_Q$(I) is an antijoin, then the corresponding join in $G_M$(I) must be either be a matching anti-join or outer join. As a transformation of a matching antijoin is straightforward, transformations involving matching outerjoins are discussed in further detail.

B. The Data Sufficiency Test requires that all columns of matching tables in the query other than the join columns be either equal to or functionally determined by columns in a materialized view.

For example, assume that query Q is based on joins R|-$_{r.a=s.a}$S and materialized view M is based on joins R->$_{r.a=s.a}$S><$_{s.c=t.c}$T. Then intersection subgraph $G_M$(I)=R and delta subgraph ΔG(M)=T. If $G_M$(I)><ΔG(M) is lossless, i.e., in this case if (R->S)><T is lossless, then query Q can rewritten be using M.

Database metadata may be examined to determine whether (R->S)><T is lossless. Specifically, if S.c column is referentially constrained by the T.c column, then (R->S) ><$_{s.c=t.c}$T is lossless. Alternatively, the view definition of materialized view M may be examined to determine whether the join between S and T is an outer join, i.e., the materialized view definition specifies (R->S)->$_{s.c=t.c}$T. If so, then (R->S)->$_{s.c=t.c}$T is lossless with respect to (R->S). Furthermore, if column T.c is unique, due to for example a unique constraint on T.c, then the join (R->S)->$_{s.c=t.c}$T is one-to-one lossless. The query Q may thus be rewritten to reference the materialized view M.

In the above example, ΔG(M) contained only one table T. Determining losslessness is more complicated when ΔG(M) contains more tables. For example, consider materialized view M that joins four tables (R->S)><$_{s.c=t.c}$T><$_{t.c=w.c}$W. Then $G_M$(I)=R->S, and ΔG(M)=T><W. Rewrite with M is possible if join (R->S)><$_{s.c=t.c}$(T><$_{t.c=w.c}$W) is lossless. This occurs if the inner joins S><$_{s.c=t.c}$T and T><$_{t.c=w.c}$W are lossless. The first join joins ΔG(M) to $G_M$(I) and the second is an internal join in ΔG(M). If S.c is referentially constrained by T.c and column T.c is referentially constrained by column W.c, then (R->S)><$_{s.c=t.c}$(T><$_{t.c=w.c}$W) is lossless. Furthermore, if columns T.c and W.c are also unique, then (R->S)><$_{s.c=t.c}$(T><$_{t.c=w.c}$W) is one-to-one lossless. Another sufficient condition is that the join between S and T is an outer join, i.e., if M=(R->S)->$_{s.c=t.c}$(T><$_{t.c=w.c}$W). Furthermore, if columns T.c and W.c are unique, then (R->S)->$_{s.c=t.c}$(T><$_{t.c=w.c}$W) is one-to-one lossless.

Functional Overview

According to an aspect of the present invention, a query Q is rewritten into another query Q' that references a materialized view M in place of the antijoined tables and a subset of the tables from Q. A filter is added to screen for rows not belonging to the antijoin.

Since the join the between $G_M$(I) and ΔG(M) may be one-to-many lossless, the join may result in the duplication of G(I) rows. The duplicated rows can be eliminated by using, for example, the DISTINCT operator of the ANSI SQL language and placing a materialized view M in a new query block that contains a DISTINCT operator. The materialized view should, in this case, contain columns which allows us to uniquely distinguish individual rows of the intersection subgraph G(I). Those columns may be any unique column of each table in G(I), and typically are the pseudo rowid columns, primary or unique keys of the tables in G(I).

Exemplary Materialized View

Figure 4:
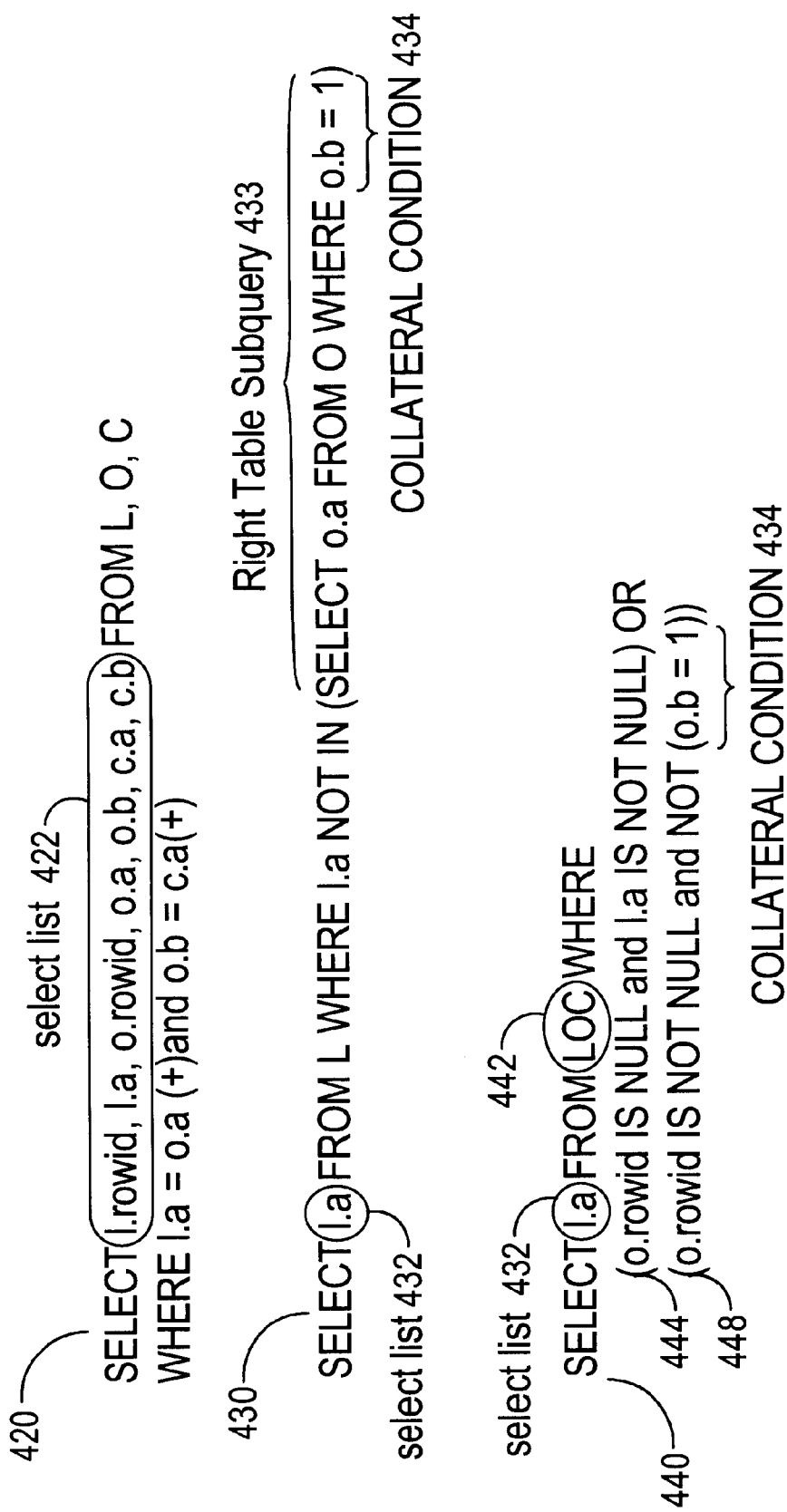
FIG. 4 is a diagram depicting a given query to be transformed, a query upon which a materialized view is based, and a transformation query resulting from the transformation of the given query according to an embodiment of the present invention.
Figure 5:
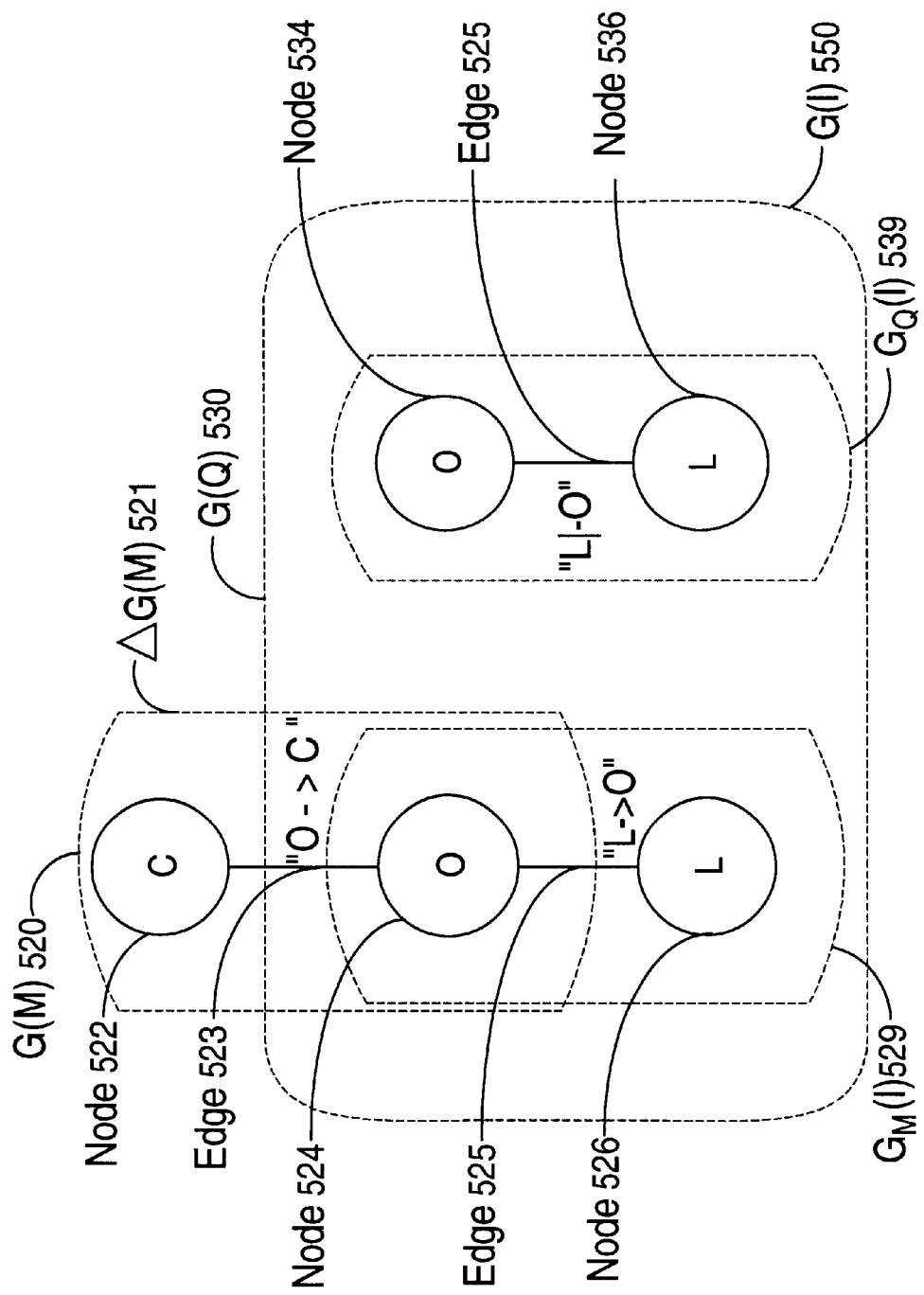
FIG. 5 is a query graph of a given query and materialized view used to illustrate an embodiment of the present invention.

The techniques described herein transform a first query specifying an antijoin into a second query that uses a materialized view. To illustrate an embodiment of the present invention, structures depicted in FIG. 3B, queries shown in FIG. 4, and the query graphs shown in FIG. 5 are provided as example.

FIG. 3B is block diagram showing table L 320, O 330, and C 350. Table L 320 has rowid pseudo column l.rowid, and columns l.a and l.b. Like table L 320, table O 330 has a rowid pseudo-column o.rowid, and columns o.a and o.b. Table C 350 has columns c.a and column c.b.

LOC 370 is a materialized view based on L->$_{l.a=o.a}$O->$_{o.b=c.a}$C. The view definition is based on a query 420 (FIG. 4), which specifies L->O->C.

Query 430 (FIG. 4) specifies antijoin $L|_{-l.a=o.a}O_{o.b=1}$. The condition o.b=1 is evaluated before the antijoin. Antijoin table 340 (FIG. 3B) represents the results of the L|-O.

Assuming that column o.a does not have NULL values, L|-O can be constructed from two sets of rows in LOC 370. The first set of rows are those that have both a NULL value in the o.rowid column and a non-NULL value in a l.a column. The second set of rows are the rows that have a non-NULL value in the o.rowid column and do not satisfy the condition o.b=1 (e.g. row 374) in the WHERE clause of the right query block. If column o.a contains a NULL value the antijoin returns no rows.

FIG. 5 shows query graph G(M) 520, the query graph for LOC 370, and G(Q) 530, the query graph for query 430. G(M) 520 includes node 522, which represents table C 350, node 524 which represents table O 330, and node 526 which represents table L 320. Edge 523 represents O->C, and edge 525 represents L->O. G(Q) 530 includes node 534, which represents table O 330, and node 536 which represents table L 320. Edge 525 represents L|-O.

Transforming a Query Specifying an Antijoin

Figure 6A:
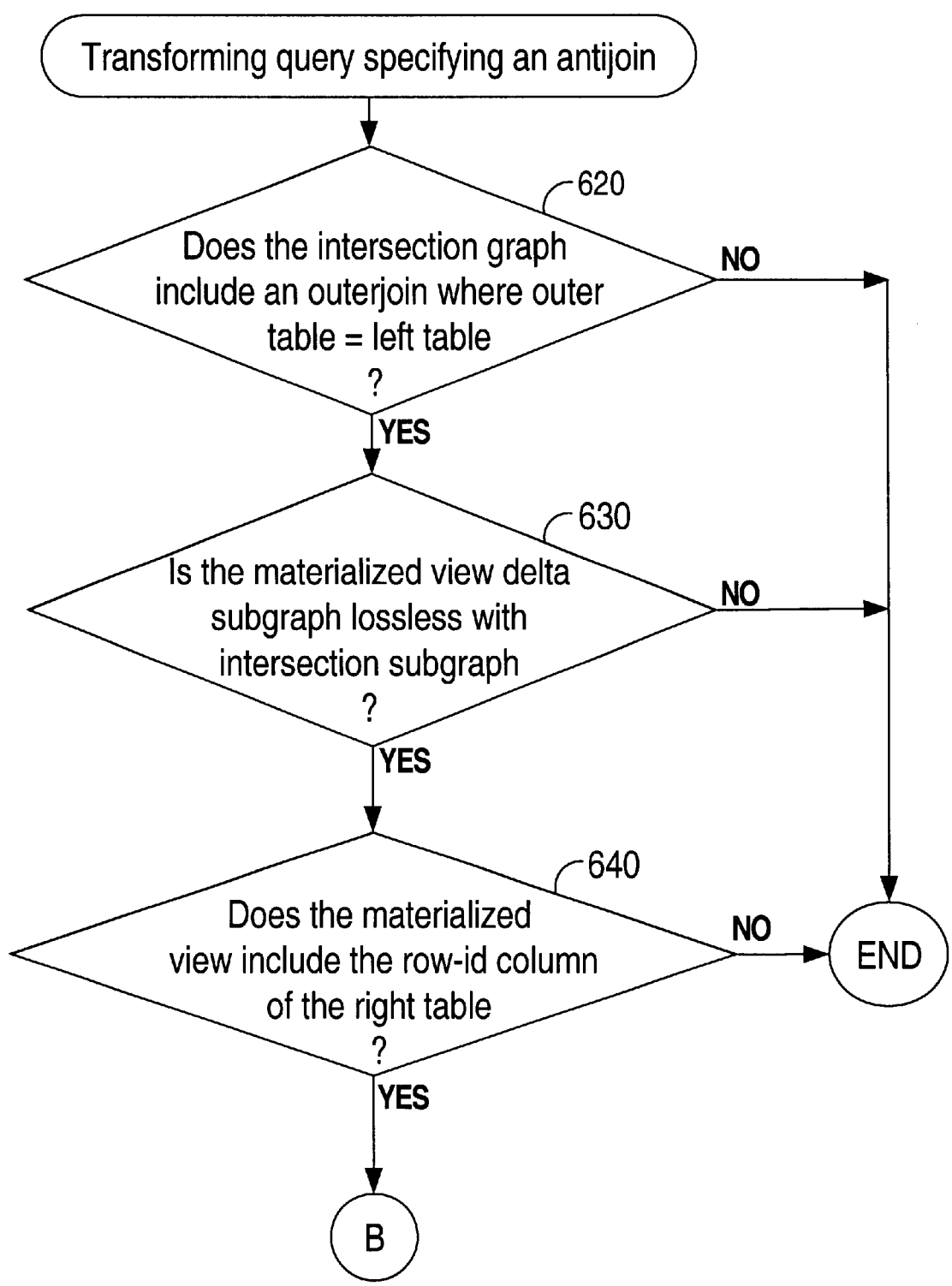
FIGS. 6A and 6B show a flow chart depicting steps for transforming a query according to an embodiment of the present invention.
Figure 6B:
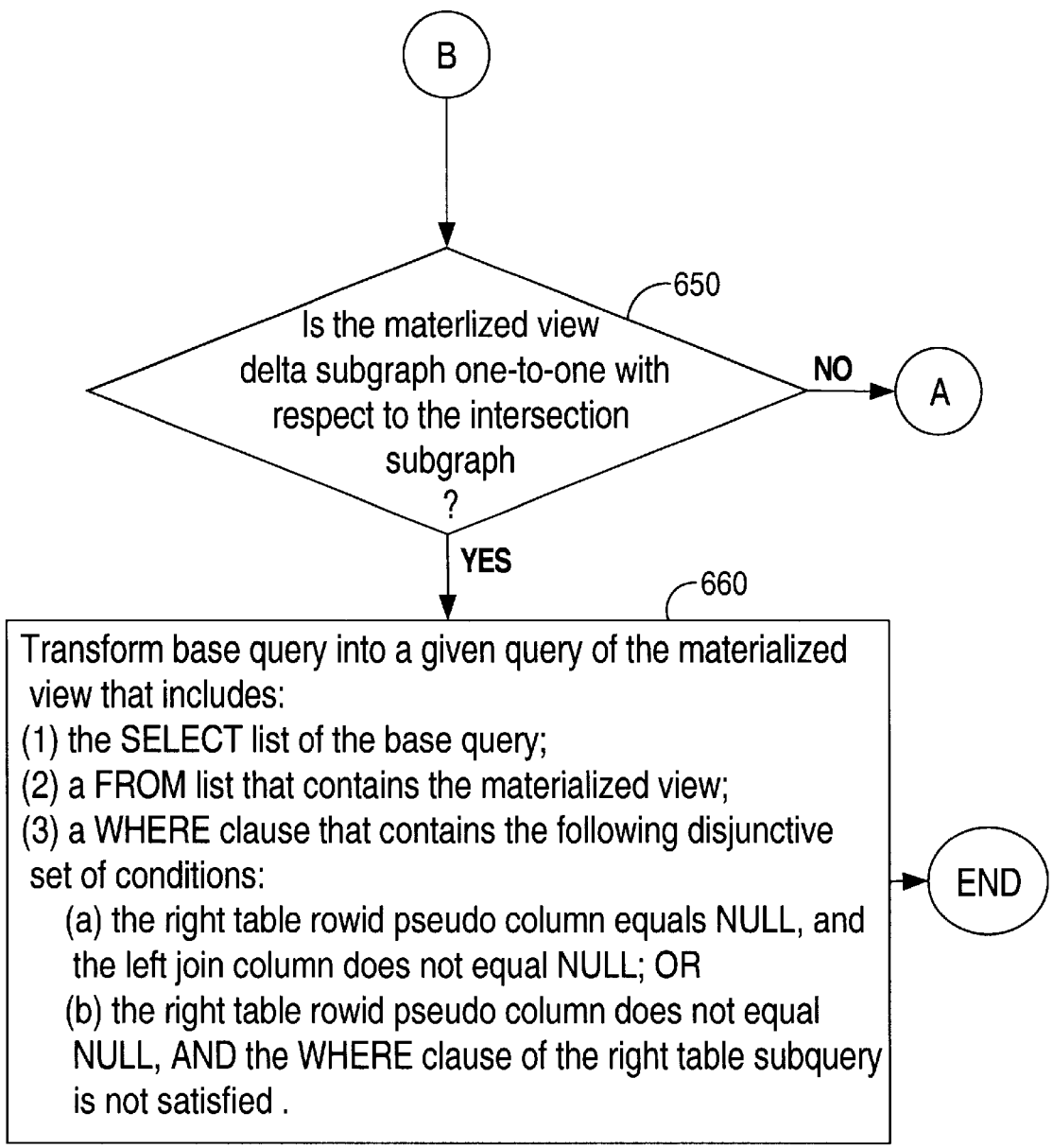

FIGS. 6A and 6B show the steps for transforming a given query that contains a given antijoin into a transformed query that references a materialized view. According to an embodiment of the present invention, the steps may be performed by a database manager in response to the database manager receiving a given query. Typically, a database manager performs various optimization procedures to determine whether the given query may be transformed into a more efficient query.

According to an embodiment of the present invention, the optimization procedures include execution of the steps shown in FIGS. 6A and 6B. The steps may be executed after the database manager selects a materialized view for examination in order to determine whether the materialized view may be used to transform the given query, and has determined the materialized view meets the data sufficiency requirements. In the example used to illustrate the steps shown in FIGS. 6A and 6B, the given query received is query 430, and the materialized view being examined is materialized view LOC 370, which is based on query 420. Query 430 specifies a given antijoin L|-O.

At step 620, it is determined whether the query graphs for the given query and materialized view form an intersection subgraph that includes an outerjoin of the antijoined tables, where the outer table of the outerjoin is the left table of the antijoin. This determination is made by comparing query graphs for the materialized view and the given query. In this example, the determination is made by comparing the query graph G(Q) 530 of query 430, and the query graph G(M) 520 of materialized view definition 420. G(M) 520 and G(Q) 530 form intersection subgraph graph G(I) 550, i.e. GM (I) 529=L->O, and $G_Q(I)$ 539=L|-O. $G_Q(I)$ includes the antijoin. Table L is both the outer table L->O of the outerjoin and the left table of the given antijoin. Thus, control flows to step 630.

At step 630, it is determined whether the join between the materialized view delta subgraph ΔG(M) and the intersection subgraph $G_M(I)$ is lossless. If the view is not lossless, execution of the steps ceases. Otherwise, control passes to step 640. In this example, the ΔG(M) 521 is outerjoined to $G_M(I)$ 529. As outerjoins are inherently lossless, the determination is that the join is lossless. Control then passes to step 640.

At step 640, it is determined whether the materialized view query includes the row-id pseudo column of the right table of the given antijoin L|-O. If the materialized view query does not include the row-id pseudo column, then execution of the steps ceases. Otherwise, control flows to step 650. In this example, the SELECT list of materialized view query 420 includes o.rowid, the rowid pseudo column of the right table of the antijoin L|-O. Thus, control flows to step 650.

Instead of determining whether the materialized view query includes the rowid pseudo column, it can be determined whether materialized view query references the primary key of O or any other expression indicating the anti-join rows. For example, DECODE(o.rowid, null, 0, 1) which evaluates to zero for antijoin rows.

At step 650, it is determined whether the join between the intersection subgraph (i.e. $G_M(I)$) is one-to-one with respect to the materialized view delta (i.e. ΔG(M)). If the join is not one-to-one with respect to the materialized view delta subgraph, then control flows to step 720 (FIG. 7), where the one-to-many transformation is performed. Otherwise, control flows to step 660, where the one-to-one transformation is performed.

In this example, table O 330 (a table in $G_M(I)$) is joined with table C 350 (a table in ΔG(M)) through c.a. Assume an examination of database metadata defining table C 350 indicates that c.a is uniquely constrained. Thus, the join between $G_M(I)$ is one-to-one with respect to the ΔG(M). Control thus passes to step 660.

At step 660, the given antijoin query is transformed into a query that references the materialized view and that includes:

(1) a SELECT list that includes the SELECT list of the given query;
(2) a FROM list that includes the materialized view;
(3) a WHERE clause that contains the following disjunctive set of conditions:
   (a) the rowid pseudo column of the right table of the antijoin equals NULL, and the left join column of the left table of the antijoin does not equal NULL; OR
   (b) the rowid pseudo column of the right table of the intersecting outerjoin does not equal NULL, AND the condition in the WHERE clause of the right table query block is not satisfied (e.g. condition 434 in right table query block 433).

(Note that in (3) immediately above that the rowid pseudo column of the right table can be replaced by a primary key of the right table or by an expression marking the antijoin rows like DECODE(o.rowid, null, 0, 1).

In this example, the query 430 is transformed into the transformed query 440. Specifically, query 440 contains:

(1) SELECT list 432 from query 430,
(2) FROM list 442 which refers to materialized view LOC 370, and
(3) a WHERE clause which contains the following disjunctive set of conditions:
   (a) condition 444, i.e. (o.rowid IS NULL and l.a IS NOT NULL), or
   (b) condition 448, i.e. (o.rowid IS NOT NULL and NOT (o.b=1))

Any row meeting condition 444 (i.e. o.rowid IS NULL and l.a IS NOT NULL) has a right table rowid pseudo column that is NULL, and a non-NULL value in the left join column. Thus, condition 444 returns the outer rows in the materialized view that result from the outerjoin L->O, such as row 376.

Any row meeting condition 448 (i.e. o.rowid IS NOT NULL AND NOT (o.b=1)) includes a row from the right table that meets the join condition of the given antijoin (i.e. the rows that satisfy "orowid IS NOT NULL"), but does not satisfy the condition 434 (i.e. "(o.b=1)").

One-to-many Transformations

Figure 7:
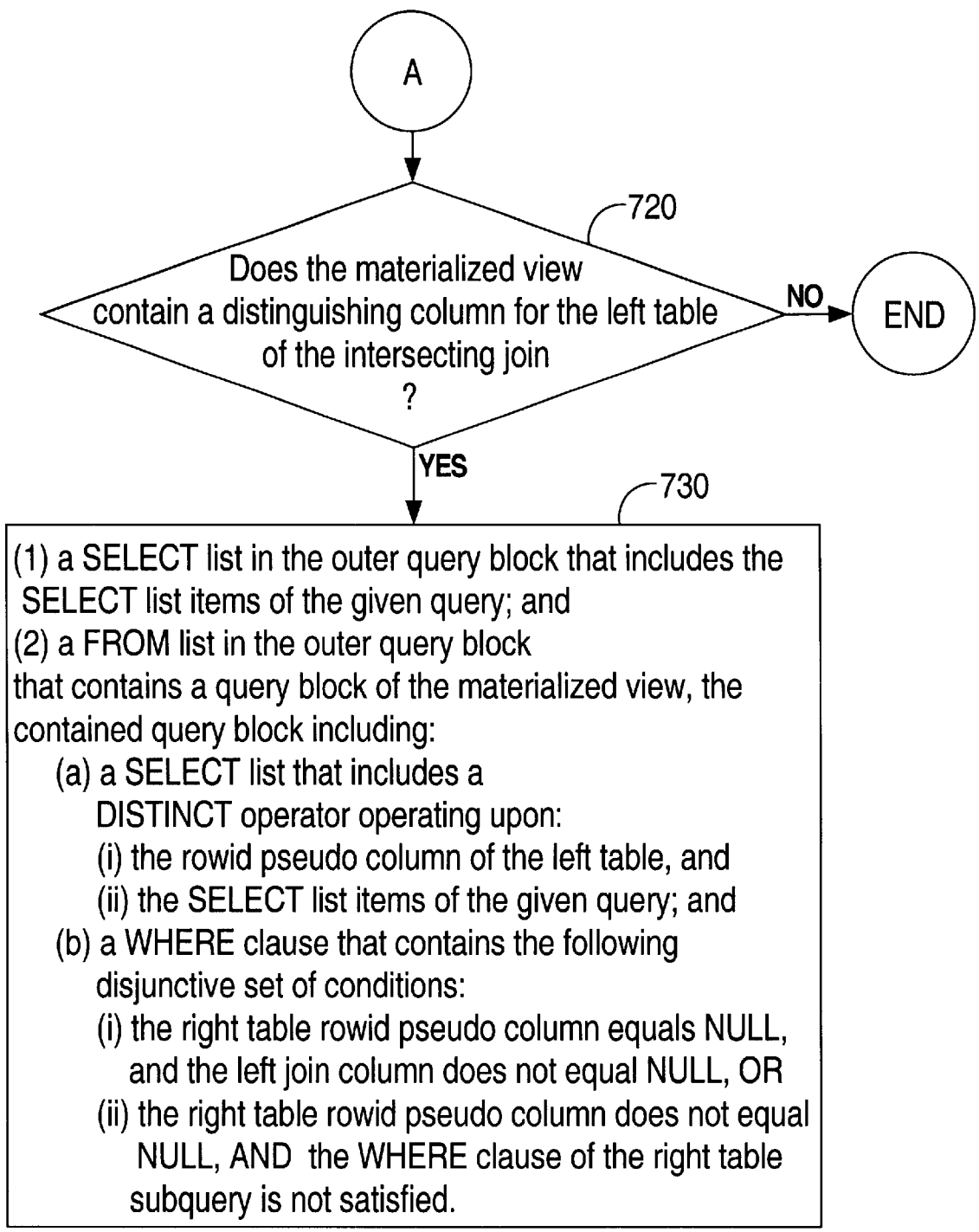
FIG. 7 is a flow chart depicting steps for transforming a query according to an embodiment of the present invention.

FIG. 7 shows the steps that may be performed for rewriting a given query with a materialized view that is not based on a one-to-one join with respect to the intersection subgraph G(I). The steps are performed when, at step 650, it is determined that the materialized view delta subgraph is not one-to-one with respect to the intersecting subgraph, and control flows to step 720 (FIG. 7). The steps of FIG. 7 are illustrated with the structures depicted in FIG. 3 and queries shown in FIG. 4, the structures previously used to illustrate the steps of FIGS. 6A and 6B. For purposes of illustration, at step 650, assume that it is not determined that the materialized view LOC 370 is one-to-one with respect to intersecting join L->O.

At step 720, it is determined whether the materialized view query selects one or more columns that may be used to uniquely distinguish rows within the left table of the given antijoin from other rows in the left table. If there are no distinguishing columns for the left table, then execution of the steps ceases. Otherwise control flows to step 730.

There are a variety of techniques that may be used to make this determination. For example, the SELECT list of the materialized view query may be examined to determine whether the select list contains a column that uniquely identifies the rows in the left table. Examples of columns which uniquely identify rows in this manner are a rowid pseudo-column, a uniquely constrained column, and a unique key column. In the above example, it is determined that a rowid column (l.rowid), the rowid pseudo-column of left table L 320, is contained in SELECT list 422 (FIG. 4) of query 420. Therefore, control flows to step 730.

At step 730, the given antijoin query is transformed into a query that references the materialized view that includes:
  (1) a SELECT list in the outer query block that includes the SELECT list items of the given query Q; and
  (2) a FROM list in the outer query block that contains a contained query block referencing the materialized view, the contained query block including:
    (a) a SELECT list that includes a DISTINCT operator operating upon:
      (i) the rowid pseudo column of the left table of the given antijoin, and
      (ii) the SELECT list items of the given query Q;
    (b) a WHERE clause that contains the following disjunctive set of conditions:
      (i) the right table rowid pseudo column equals NULL, and the left join column does not equal NULL, OR
      (ii) the right table rowid pseudo column does not equal NULL, AND the condition in the WHERE clause of the right table query block is not satisfied.

Figure 8:
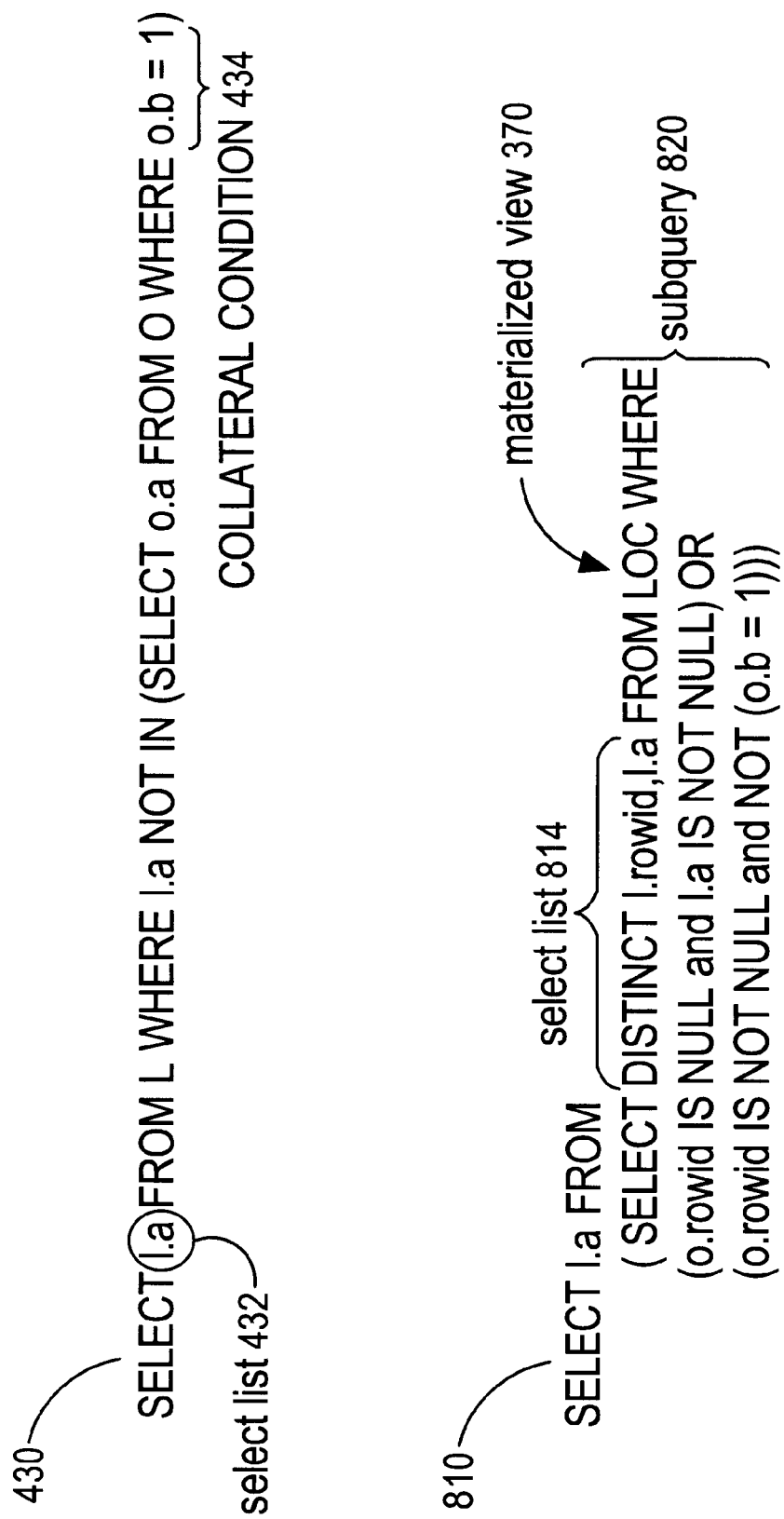
FIG. 8 is a diagram depicting a given query to be transformed, and a transformation query resulting from the transformation of the given query according to an embodiment of the present invention.

The DISTINCT operator eliminates duplicates of rows from table L 320 that may arise due to the one-to-many relationship between the materialized view delta subgraph ΔG(M) and the intersecting subgraph G(I). FIG. 8 shows query 810, the query resulting from the transformation of given query 430 performed at step 740 in this example. SELECT list 814, the select list of the query block 820 referencing materialized view LOC 370, includes a DISTINCT operator that operates upon l.rowid (i.e. rowid pseudo column of the left table of the intersecting join i.e. table L 320) and l.a (the only item in SELECT list 432).

Transforming Queries with Multiple Tables in the Outer Query Block of an Antijoin Query A given query which specifies a given antijoin can be transformed when the query specifies a join between additional tables and the left table. An example of such a query is $(J><L)|_{l.a=o.a}O$. Specifically, the given query may be transformed if in addition to the tests shown in FIGS. 6A and 6B (i.e. steps 620–650), an additional test is satisfied. Specifically, the intersection subgraph $G_M(I)$ must contain an inner or outerjoin between the additional tables and the left table. If the join between ΔG(M) is one-to-one with respect to G(I), then the given query may be transformed in a manner similar to step 660.

Figure 9:
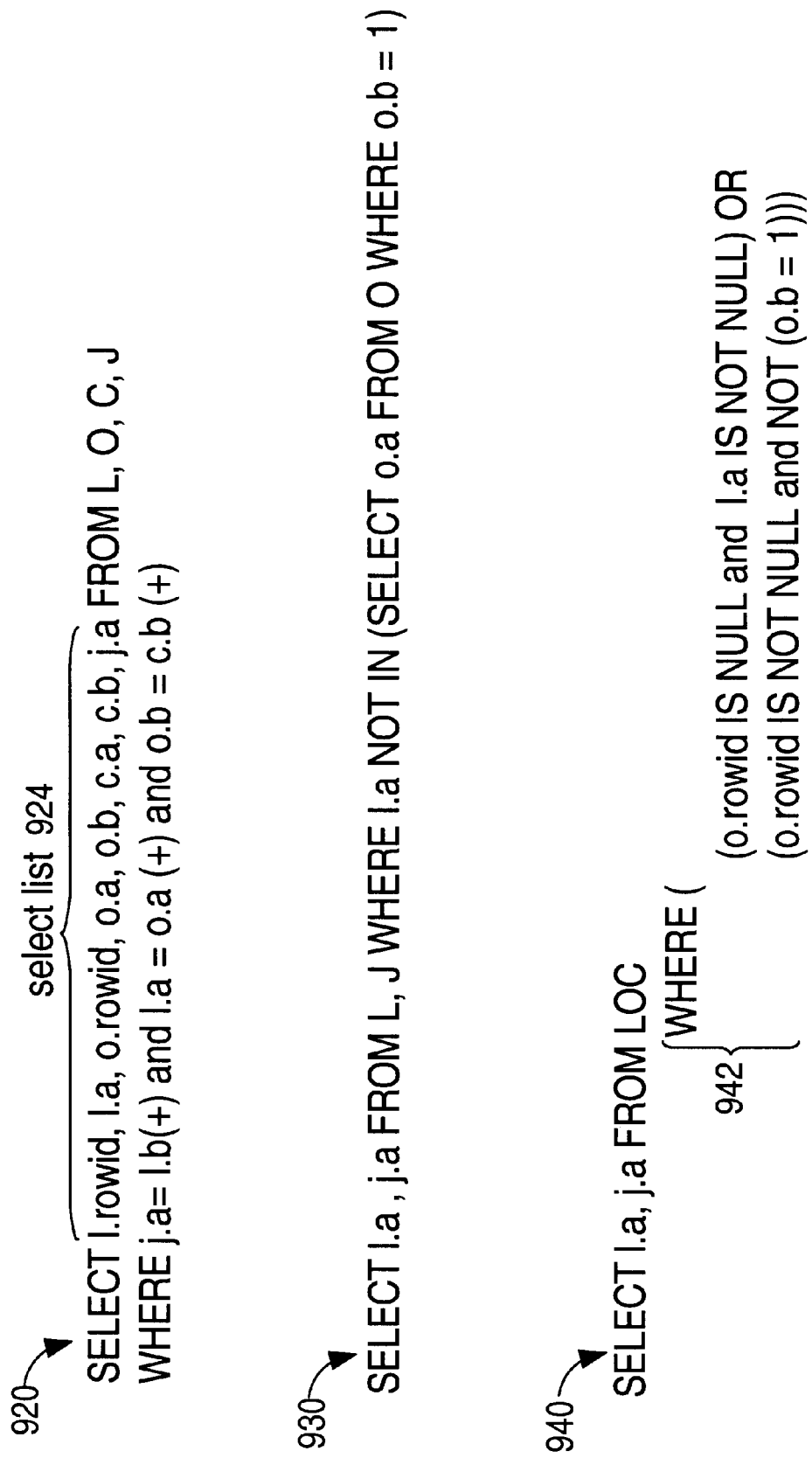
FIG. 9 is a diagram depicting a given query to be transformed, a query upon which a materialized view is based, and a transformation query resulting from the transformation of the given query according to an embodiment of the present invention.

FIG. 9 shows queries used to illustrate the transformation of an antijoin query having an additional table joined to the left table, when the join between ΔG(M) is one-to-one with respect to G(I). Materialized view MT (not shown) is based upon Query 920. Query 920 specifies $J><_{j.a=l.b}L->_{l.a=o.a}O->_{o.b=c.b}C$.

Query 930 specifies $(J><L)|_{l.a=o.a}O$. $G_M(I)$ is J><L->O and ΔG(M)=O->C. Because $G_M(I)->\Delta G(M)$ is lossless and one-to-one with respect to $G_M(I)$, the given query can be transformed into query 940.

FIG. 10 shows transformed query 1040, the transformed query resulting from the transformation of the given query 930. The DISTINCT operator 1044 operates upon operands 1046.

If G(I)><ΔG(M) is one-to-many with respect to G(I), then the given query 930 may be transformed in a manner similar to step 730, with the additional step of including the rowid pseudo column of the additional table J as an operand in the DISTINCT operator in the query block referencing the materialized view.

Hardware Overview

Figure 11:
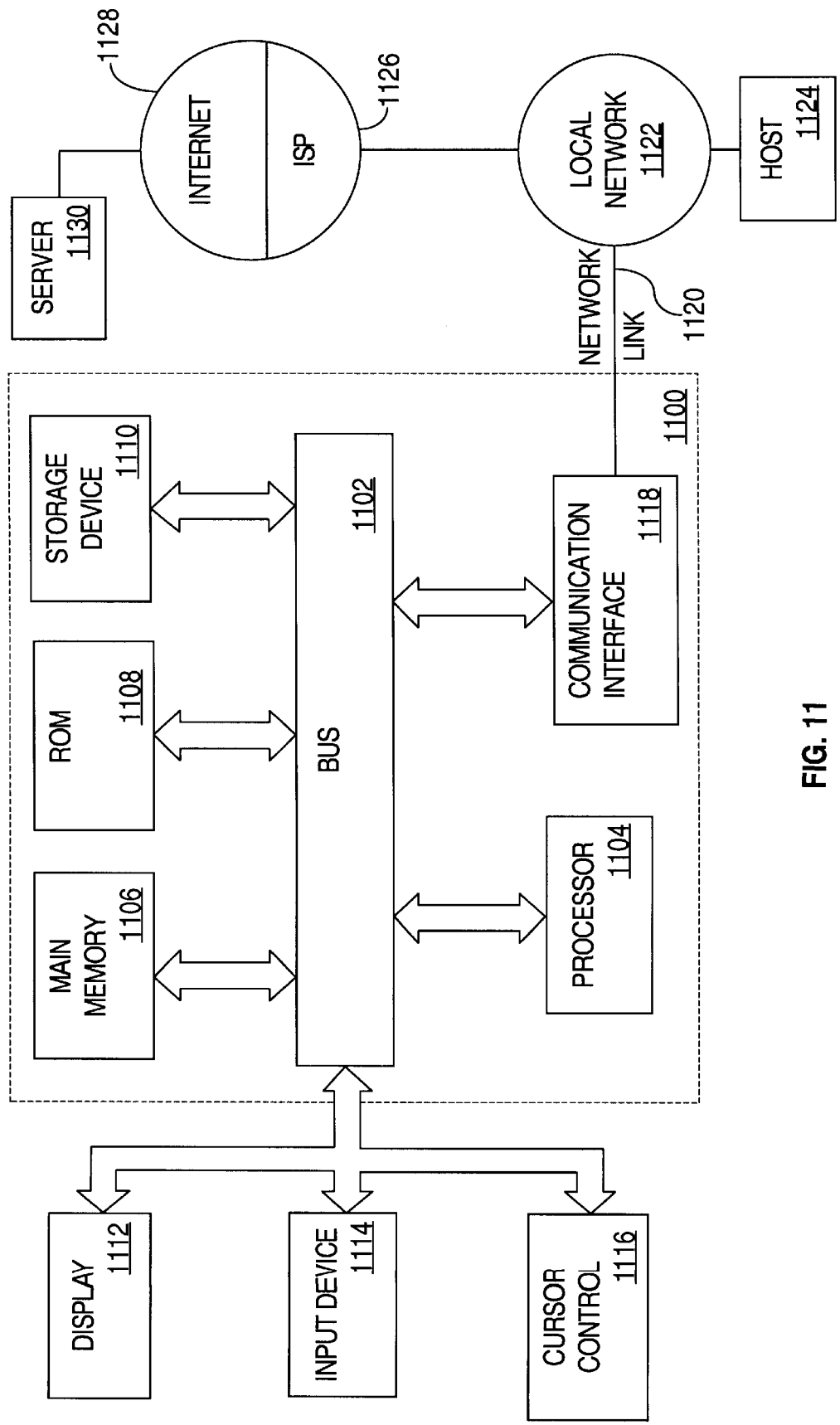
FIG. 11 is a block diagram depicting a computer system upon which an embodiment of the present invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for transforming queries. According to one embodiment of the invention, transforming queries is provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides for transforming queries as described herein.

The received code may be executed by processor 1104 as it is received, and/or stored in storage device 1110, or other non-volatile storage for later execution. In this manner, computer system 1100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of transforming a first query, the method comprising the steps of:

receiving said first query, wherein said first query defines an antijoin between a left table and a right table;

determining whether a common section is shared between a view and said first query, wherein a view definition for said view includes a join between said common section and a materialized view delta, said common section including an outerjoin between said left table and said right table, said left table being the outer table of said outerjoin;

determining whether said join between said common section and said materialized view delta is lossless with respect to said common section; and if said join between said common section and said materialized view delta is lossless with respect to said common section, then transforming said first query into a second query that accesses data through said view, said second query returning the set of data specified by said first query.

2. The method of claim 1, wherein said view is a materialized view and the step of transforming said received query includes transforming said received query into a transformed query that references said materialized view.

3. The method of claim 1, wherein the step of receiving said received query includes receiving a query that defines an antijoin operation using a NOT IN operator that operates upon a query block referencing said right table.

4. The method of claim 1, wherein the step of receiving said received query includes receiving a query that defines an antijoin operation using a NOT EXISTS operator that operates upon a query block referencing said right table.

5. The method of claim 1, further including the step of determining whether said join between said common section and said material view delta is one-to-one.

6. The method of claim 5, wherein rows presented from said view each correspond to one row from said left table, and the step of transforming said received query into a transformed query further includes the steps of:
   if said join between said common section and said material view delta is not one-to-one, then:
      determining whether said view selects one or more distinguishing columns of the left table, that for each of said rows presented by said view, uniquely identify the one row from said left table that corresponds to said row presented by said view; and
      if said view selects one or more distinguishing columns of the left table, then rewriting said received query to include a query block that references said view, said query block including a DISTINCT operator that operates upon a list of columns that include said one or more distinguishing columns.

7. The method of claim 6, wherein the step of determining whether said view selects one or more distinguishing columns further includes determining whether said view selects a rowid pseudo column of said left table.

8. The method of claim 6, wherein:
   said right table includes a rowid pseudo column;
   said received first query references a left join column for said antijoin;
   said received query includes a first SELECT list; and
   the step of transforming said received query into a transformed query further includes the step of if said join between said common section and said material view delta is not one-to-one, then transforming said received query into a transformed query with an outer query block that includes:
      (1) a second SELECT list that includes said first SELECT list of the query,
      (2) a FROM list that references said view in a query block, said query block including:
         (a) a third SELECT list that includes a distinct operator operating upon
            (i) the left table rowid pseudo column, and
            (ii) the one or more columns referenced by said first SELECT list, and
         (b) a WHERE clause that includes a first condition that is satisfied when said rowid pseudo column of said right table equals NULL, and the left join column does not equal NULL.

9. The method of claim 8, wherein:
   said received query includes a right table query block with a WHERE condition; and
   the step of transforming said received query into a transformed query if said join between said common section and said material view delta is one-to-one, further includes transforming said received query into a transformed query whose WHERE clause includes a second condition that is satisfied when both said rowid pseudo column of the right table does not equal NULL and the WHERE condition of the right table query block is not satisfied.

10. The method of claim 5, wherein:
    said right table includes a rowid pseudo column;
    said received first query references a left join column for said antijoin;
    said received query includes a first SELECT list; and
    the step of transforming said received query into a transformed query further includes the step of if said join between said common section and said material view delta is one-to-one, then transforming said received query into a transformed query that includes:
       (1) a second SELECT list that includes said first SELECT list,
       (2) a FROM list that includes said view,
       (3) a WHERE clause that includes a first condition that is satisfied when said rowid pseudo column of said right table equals NULL, and said left join column does not equal NULL.

11. The method of claim 10, wherein:
    said received query includes a right table query block with a WHERE condition; and
    the step of transforming said received query into a transformed query with an outer query block if said join between said common section and said material view delta is not one-to-one, further includes transforming said received query into a transformed query with an outer query block whose WHERE clause includes a second condition that is satisfied when both said rowid pseudo column of the right table does not equal NULL and the WHERE condition of the right table query block is not satisfied.

12. The method of claim 1, wherein the step of determining whether said join between said common section and said materialized view delta is lossless includes determining whether said left or right tables are outer joined to a third table.

13. The method of claim 1, wherein the step of determining whether said join between said common section and said materialized view delta is lossless includes determining whether said one of left and right tables is referentially constrained to said third table.

14. A computer-readable medium carrying one or more sequences of one or more instructions for transforming a first query, wherein the execution of the one or more sequences of the one or more instructions causes the one or more processors to perform the steps of:
    receiving said first query, wherein said first query defines an antijoin between a left table and a right table;
    determining whether a common section is shared between a view and said first query, wherein a view definition for said view includes a join between said common section and a materialized view delta, said common section including an outerjoin between said left table and said right table, said left table being the outer table of said outerjoin;
    determining whether said join between said common section and said materialized view delta is lossless with respect to said common section; and
    if said join between said common section and said materialized view delta is lossless with respect to said common section, then transforming said first query into a second query that accesses data through said view, said second query returning the set of data specified by said first query.

15. The computer-readable medium of claim 14, wherein said view is a materialized view and the step of transforming said received query includes transforming said received query into a transformed query that references said materialized view.

16. The computer-readable medium of claim 14, wherein the step of receiving said received query includes receiving a query that defines an antijoin operation using a NOT IN operator that operates upon a query block referencing said right table.

17. The computer-readable medium of claim 14, wherein the step of receiving said received query includes receiving a query that defines an antijoin operation using a NOT EXISTS operator that operates upon a query block referencing said right table.

18. The computer-readable medium of claim 14, further including the step of determining whether said join between said common section and said material view delta is one-to-one.

19. The computer-readable media of claim 18, wherein rows presented from said view each correspond to one row from said left table, and the step of transforming said received query into a transformed query further includes the steps of:

if said join between said common section and said material view delta is not one-to-one, then:
determining whether said view selects one or more distinguishing columns of the left table, that for each of said rows presented by said view, uniquely identify the one row from said left table that corresponds to said row presented by said view; and
if said view selects one or more distinguishing columns of the left table, then rewriting said received query to include a query block that references said view, said query block including a DISTINCT operator that operates upon a list of columns that include said one or more distinguishing columns.

20. The computer-readable media of claim 19, wherein the step of determining whether said view selects one or more distinguishing columns further includes determining whether said view selects a rowid pseudo column of said left table.

21. The computer-readable media of claim 20, wherein:
said right table includes a rowid pseudo column;
said received first query references a left join column for said antijoin;
said received query includes a first SELECT list; and
the step of transforming said received query into a transformed query further includes the step of if said join between said common section and said material view delta is not one-to-one, then transforming said received query into a transformed query with an outer query block that includes:
(1) a second SELECT list that includes said first SELECT list of the query,
(2) a FROM list that references said view in a query block, said query block including:
(a) a third SELECT list that includes a distinct operator operating upon
(i) the left table rowid pseudo column, and
(ii) the one or more columns referenced by said first SELECT list, and
(b) a WHERE clause that includes a first condition that is satisfied when said rowid pseudo column of said right table equals NULL, and the left join column does not equal NULL.

22. The computer-readable media of claim 21, wherein:
said received query includes a right table query block with a WHERE condition; and
the step of transforming said received query into a transformed query with an outer query block if said join between said common section and said material view delta is not one-to-one, further includes transforming said received query into a transformed query with an outer query block whose WHERE clause includes a second condition that is satisfied when both said rowid pseudo column of the right table does not equal NULL and the WHERE condition of the right table query block is not satisfied.

23. The computer-readable media of claim 18, wherein:
said right table includes a rowid pseudo column;
said received first query references a left join column for said antijoin;
said received query includes a first SELECT list; and
the step of transforming said received query into a transformed query further includes the step of if said join between said common section and said material view delta is one-to-one, then transforming said received query into a transformed query that includes:
(1) a second SELECT list that includes said first SELECT list,
(2) a FROM list that includes said view,
(3) a WHERE clause that includes a first condition that is satisfied when said rowid pseudo column of said right table equals NULL, and said left join column does not equal NULL.

24. The computer-readable media of claim 23, wherein:
said received query includes a right table query block with a WHERE condition; and
the step of transforming said received query into a transformed query if said join between said common section and said material view delta is one-to-one, further includes transforming said received query into a transformed query whose WHERE clause includes a second condition that is satisfied when both said rowid pseudo column of the right table does not equal NULL and the WHERE condition of the right table query block is not satisfied.

25. The computer-readable media of claim 14, wherein the step of determining whether said join between said common section and said materialized view delta is lossless includes determining whether said left or right tables are outer joined to a third table.

26. The computer-readable media of claim 14, wherein the step of determining whether said join between said common section and said materialized view delta is lossless includes determining whether said one of left and right tables is referentially constrained to said third table.

27. A database system comprising:
a processor;
a memory coupled to said processor;
said processor configured to receive a first query, wherein said first query defines an antijoin between a left table and a right table;
a view definition defining a view;
said processor configured to determine whether a common section is shared between said view and said first query, wherein said view definition specifies a join between said common section and a materialized view delta, said common section including an outerjoin between said left table and said right table, said left table being the outer table of said outerjoin;
said processor configured to determine whether said join between said common section and said materialized view delta is lossless with respect to said common section; and
said processor configured to, if said join between said common section and said materialized view delta is lossless with respect to said common section, transform said first query into a second query that accesses data through said view, said second query returning the set of data specified by said first query.

28. The database system of claim 27, wherein said view is a materialized view.

* * * * *